(12) United States Patent
Kishi

(10) Patent No.: US 9,749,502 B2
(45) Date of Patent: Aug. 29, 2017

(54) CALIBRATION SYSTEM, CALIBRATION METHOD, AND RECORDING MEDIUM FOR COORDINATING COLOR VALUE OF OUTPUT COLOR OF ONE IMAGE FORMING APPARATUS WITH COLOR VALUE OF OUTPUT COLOR OF ANOTHER IMAGE FORMING APPARATUS

(71) Applicant: KYOCERA Document Solutions Inc., Osaka (JP)

(72) Inventor: Yoshitaka Kishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 98 days.

(21) Appl. No.: 14/883,150

(22) Filed: Oct. 14, 2015

(65) Prior Publication Data

US 2016/0112581 A1    Apr. 21, 2016

(30) Foreign Application Priority Data

Oct. 21, 2014    (JP) .................................. 2014-214891

(51) Int. Cl.
*G06F 15/00* (2006.01)
*H04N 1/60* (2006.01)

(52) U.S. Cl.
CPC .................................. *H04N 1/6033* (2013.01)

(58) Field of Classification Search
CPC .................................................. H04N 1/6033

USPC ......................................................... 358/504
See application file for complete search history.

(56) References Cited

U.S. PATENT DOCUMENTS

2003/0164960 A1* 9/2003 Housel ................. H04N 1/6055
358/1.9

FOREIGN PATENT DOCUMENTS

JP    2006-222552 A    8/2006
JP    2010-226562 A    10/2010

* cited by examiner

*Primary Examiner* — Mark Milia
(74) *Attorney, Agent, or Firm* — Stein IP, LLC

(57) ABSTRACT

A calibration system includes a photographing device, a first image forming apparatus, a second image forming apparatus, and a tone-characteristics correcting circuit. The first image forming apparatus prints a first chart including patches in a plurality of colors. The second image forming apparatus prints a second chart corresponding to the first chart. The tone-characteristics correcting circuit corrects tone characteristics of the first image forming apparatus. The tone-characteristics correcting circuit corrects the tone characteristics of the first image forming apparatus to tone characteristics of the second image forming apparatus based on a difference in color value of patches between the first chart and the second chart in a both-side print chart image generated such that the first chart and the second chart are simultaneously photographed by the photographing device.

2 Claims, 11 Drawing Sheets

CALIBRATION SYSTEM, CALIBRATION METHOD, AND RECORDING MEDIUM FOR COORDINATING COLOR VALUE OF OUTPUT COLOR OF ONE IMAGE FORMING APPARATUS WITH COLOR VALUE OF OUTPUT COLOR OF ANOTHER IMAGE FORMING APPARATUS

INCORPORATION BY REFERENCE

This application is based upon, and claims the benefit of priority from, corresponding Japanese Patent Application No. 2014-214891 filed in the Japan Patent Office on Oct. 21, 2014, the entire contents of which are incorporated herein by reference.

BACKGROUND

Unless otherwise indicated herein, the description in this section is not prior art to the claims in this application and is not admitted to be prior art by inclusion in this section.

As a typical method for calibration to perform correction of input-output characteristics, what is called, gamma correction caused by, for example, a secular change of an image forming apparatus such as a printer-only machine and a Multifunction Peripheral (MFP), there is known a method for measuring the current output color using a scanner attached to the MFP or a print density sensor inside the image forming apparatus to correct the input-output characteristics such that the color value of the output color becomes a target color value.

However, mutual coordination of the color values of the output colors between image forming apparatuses as different models requires an expensive dedicated colorimeter such as a spectrophotometric colorimeter. However, to prepare and master the dedicated colorimeter, it is difficult for a general user.

Therefore, there is proposed a calibration system that realizes simple and low-cost calibration by using an photographing device such as a digital camera and a mobile phone with a camera as an alternate device of the dedicated colorimeter.

In one calibration system, firstly, a reference chart including patches in a plurality of colors and a test chart printed by an image forming apparatus corresponding to the reference chart are simultaneously photographed by an photographing device. The, the tone characteristics of the image forming apparatus is corrected based on the RGB values of the respective patches of the reference chart and the test chart in the image, which is photographed and generated by the photographing device.

In another calibration system, firstly, a reference chart including patches in a plurality of colors and a test chart printed by an image forming apparatus corresponding to the reference chart are separately photographed by an photographing device. Subsequently, a first correction value is calculated based on: the color value of the patch of the reference chart in the first image, which is photographed and generated by the photographing device; and the color value of the patch of the test chart in the second image, which is photographed and generated by the photographing device. Additionally, a second correction value is calculated based on: the color value of the patch of the reference chart in the first image, which is photographed and generated by the photographing device; and the color value of the reference preliminarily stored in the image forming apparatus. Then, the tone characteristics of the image forming apparatus are corrected based on the first correction value and the second correction value.

SUMMARY

A calibration system according to one aspect of the disclosure includes an photographing device, a first image forming apparatus, a second image forming apparatus, and a tone-characteristics correcting circuit. The first image forming apparatus prints a first chart including patches in a plurality of colors. The second image forming apparatus prints a second chart corresponding to the first chart. The tone-characteristics correcting circuit corrects tone characteristics of the first image forming apparatus. The tone-characteristics correcting circuit corrects the tone characteristics of the first image forming apparatus to tone characteristics of the second image forming apparatus based on a difference in color value of patches between the first chart and the second chart in a both-side print chart image generated such that the first chart and the second chart are simultaneously photographed by the photographing device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
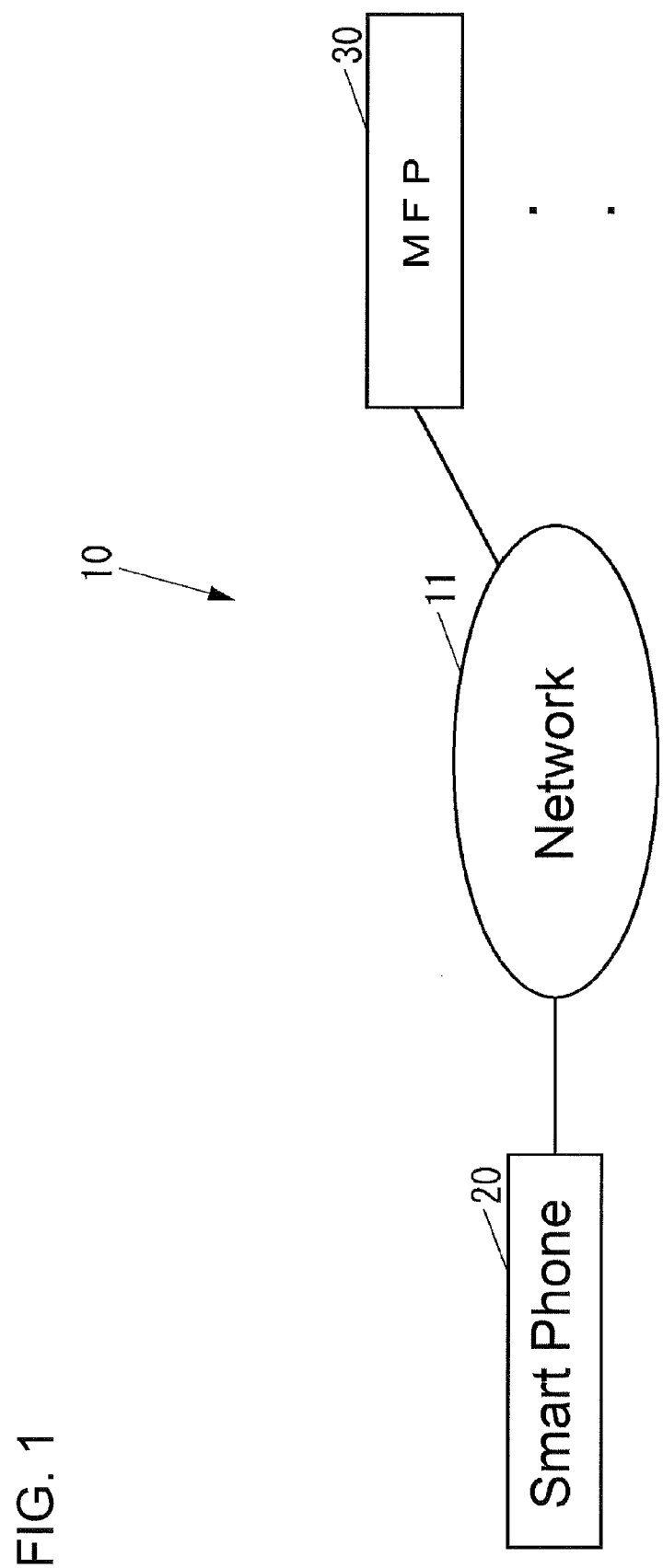
FIG. 1 illustrates a schematic diagram of a calibration system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

Firstly, a description will be provided with the configuration of a calibration system according to this embodiment.

FIG. 1 illustrates a calibration system 10 according to this embodiment.

As illustrated in FIG. 1, the calibration system 10 includes a smart phone 20 as a photographing device, a Multifunction Peripheral (MFP) 30 as an image forming apparatus, a plurality of MFPs having configurations similar to that of the MFP 30. The smart phone 20 and the plurality of MFPs are communicated with one another. Here, the smart phone 20 and the plurality of MFPs may be communicated with one another via a network 11 such as a Local Area Network (LAN) and the Internet, or may be directly communicated with one another not via the network 11 but via a communication cable such as a Universal Serial Bus (USB) cable.

Figure 2:
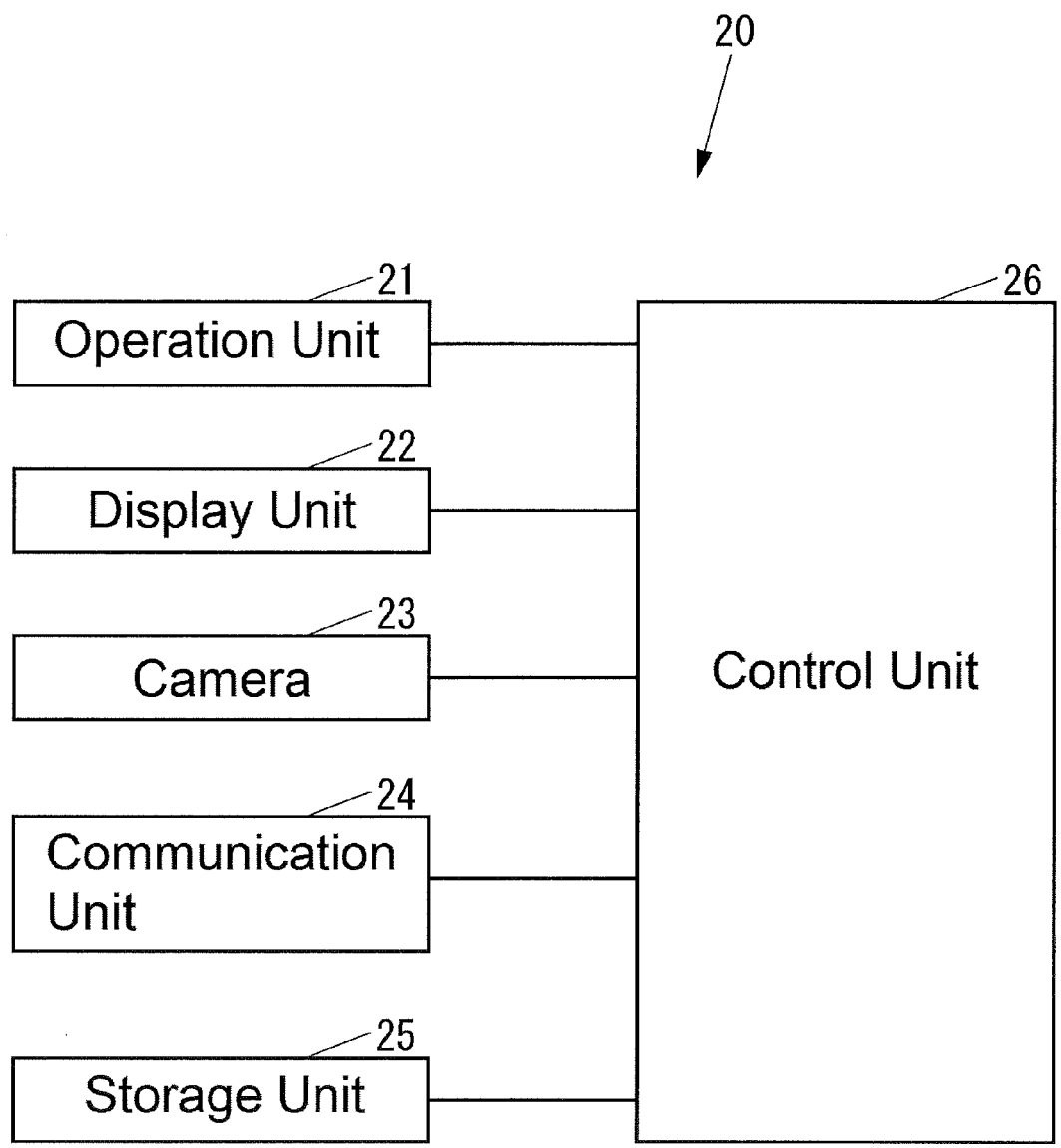
FIG. 2 illustrates a schematic diagram of a block configuration of a smart phone according to the one embodiment.

FIG. 2 illustrates the smart phone 20.

As illustrated in FIG. 2, the smart phone 20 includes: an operation unit 21 as an input device such as buttons, which receive various operations; a display unit 22 as a display device such as a Liquid Crystal Display (LCD), which displays various information; a camera 23; a communication unit 24 as a communication device, which communicates with an external device via the network 11 (see FIG. 1) and a communication cable; a storage unit 25 as a non-volatile storage device such as a Hard Disk Drive (HDD), which stores various data; and a control unit 26, which controls the entire smart phone 20.

For example, the control unit 26 includes: a Central Processing Unit (CPU); a Read Only Memory (ROM), which stores various data; and a Random Access Memory (RAM), which is used as the work area of the CPU. The CPU executes the program stored in the ROM or the storage unit 25.

Figure 3:
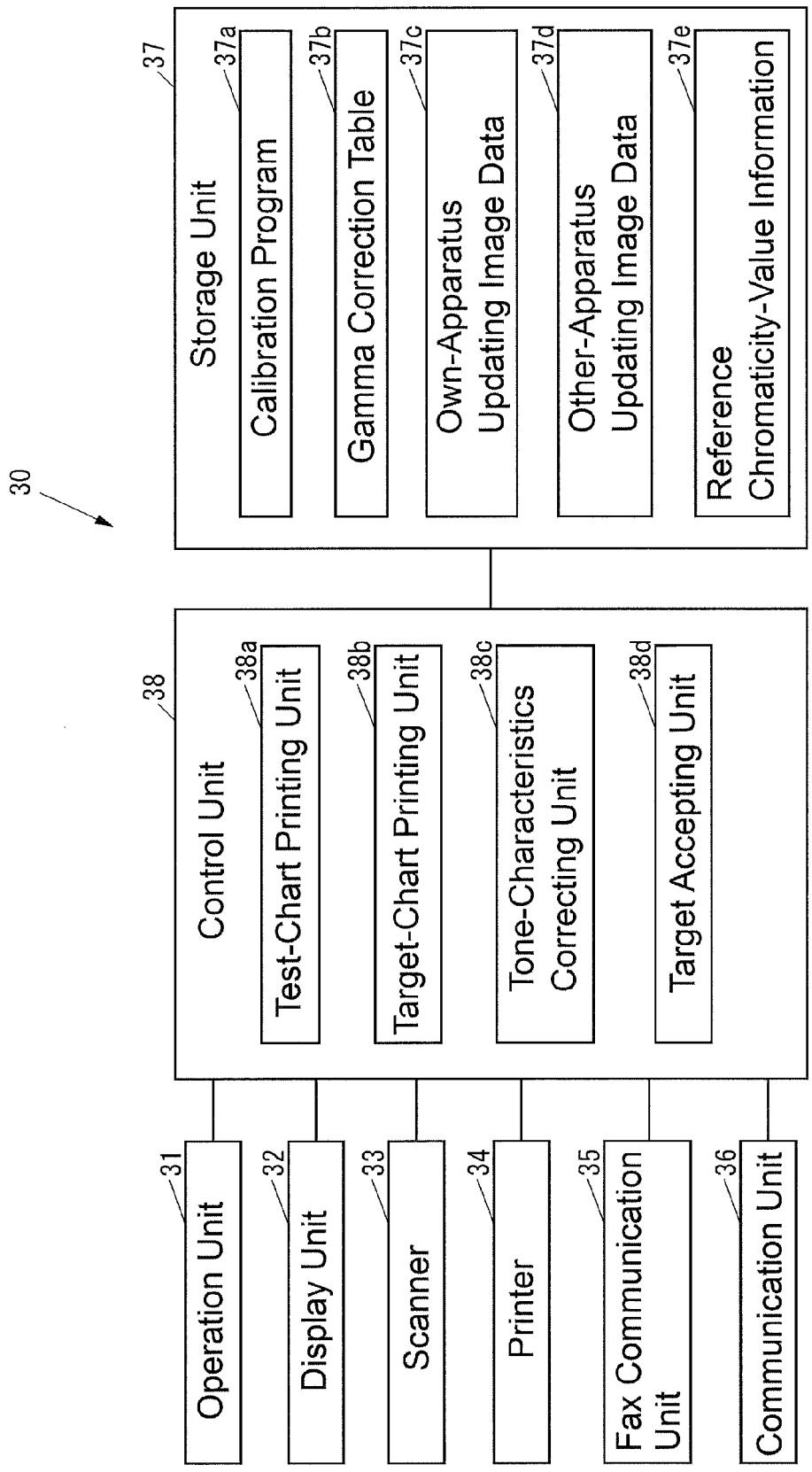
FIG. 3 illustrates a schematic diagram of a block configuration of an MFP according to the one embodiment.

FIG. 3 illustrates the MFP 30.

As illustrated in FIG. 3, the MFP 30 includes: an operation unit 31 as an input device such as a button, which receives various operations; a display unit 32 as a display device such as an LCD, which displays various information; a scanner 33 as a reading device, which reads an image from a document; a printer 34 as a print device, which executes printing on a recording medium such as a paper sheet; a fax communication unit 35 as a fax device, which performs fax communication with an external facsimile device (not illustrated) via a communication line such as a dial-up line; a communication unit 36 as a communication device, which communicates with an external device via the network 11 (see FIG. 1) or a communication cable; a storage unit 37 as a non-volatile storage device such as an Electrically Erasable Programmable Read Only Memory (EEPROM) and an HDD, which stores various data; and a control unit 38, which controls the entire MFP 30.

The storage unit 37 stores a calibration program 37a for correcting the tone characteristics of the printer 34. The calibration program 37a may be installed on the MFP 30 at production stage of the MFP 30, may be additionally installed on the MFP 30 from a storage medium such as an SD card and a Universal Serial Bus (USB) memory, or may be additionally installed on the MFP 30 from the network 11.

The storage unit 37 stores a gamma correction table (Lookup Table: LUT) 37b for correcting the tone characteristics of the MFP 30.

Figure 4:
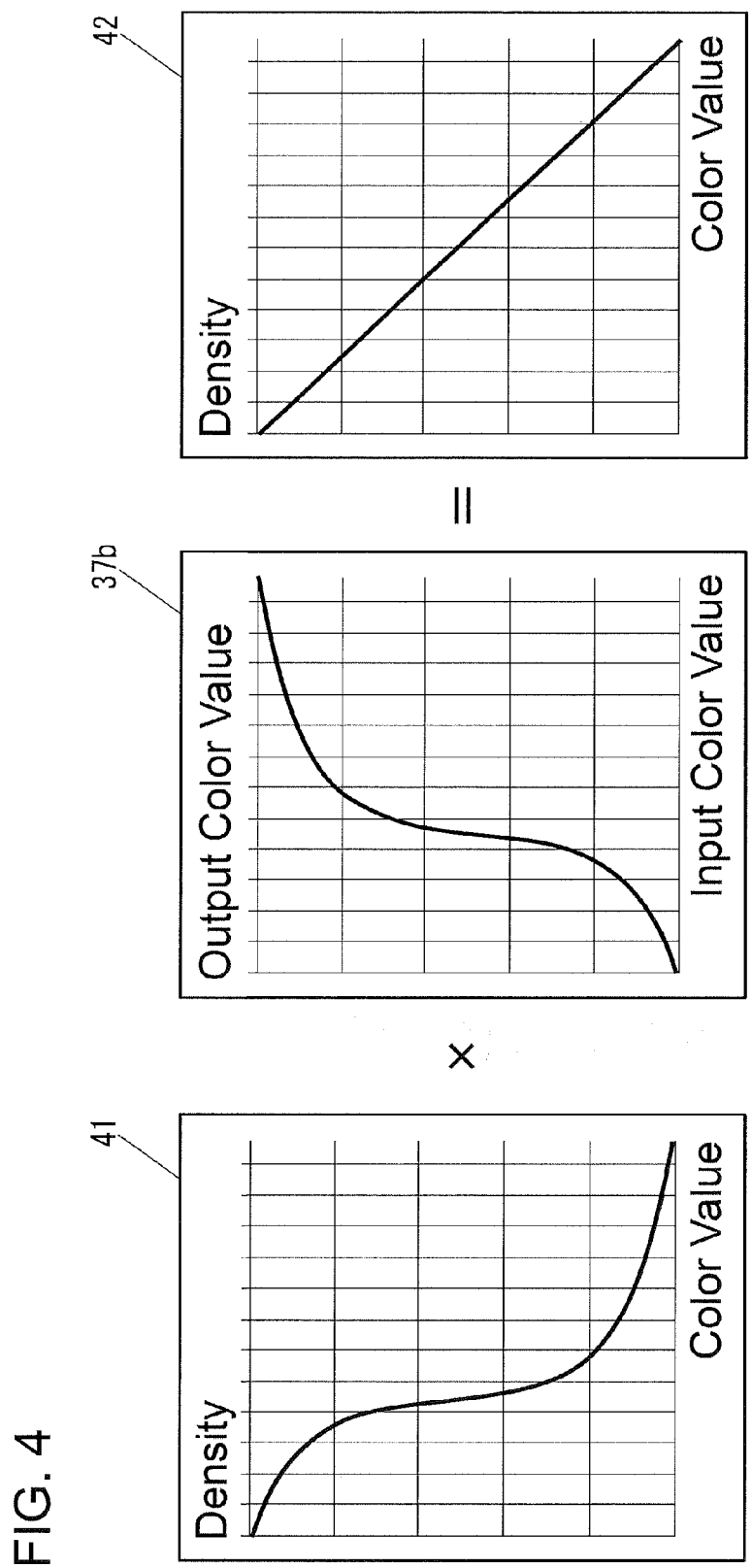
FIG. 4 illustrates a schematic diagram of the principle of a gamma correction table according to the one embodiment.

FIG. 4 illustrates the principle of the gamma correction table 37b.

As illustrated in FIG. 4, even when actual tone characteristics 41 of the printer 34 is shifted from expected tone characteristics 42, the expected tone characteristics 42 can be realized by applying the gamma correction table 37b to the actual tone characteristics 41 of the printer 34.

As illustrated in FIG. 3, the storage unit 37 stores: own-apparatus updating image data 37c as image data of a chart including patches in a plurality of colors for updating the gamma correction table 37b of the MFP 30 itself; and other-apparatus updating image data 37d as image data of a chart including patches in a plurality of colors for updating a gamma correction table of another image forming apparatus.

Figure 5A:
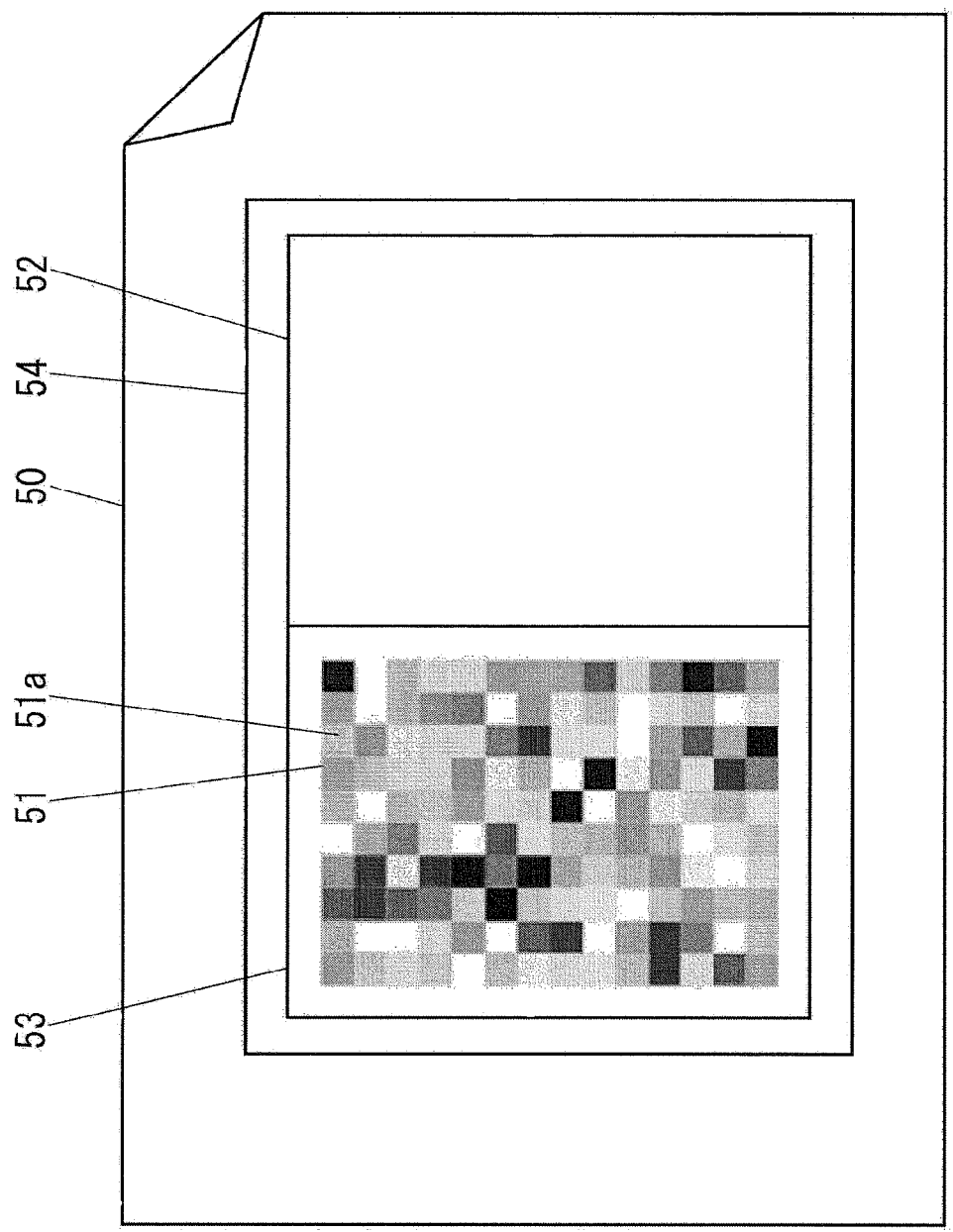
FIG. 5A illustrates a schematic diagram of one example of a test sheet printed based on own-apparatus updating image data according to the one embodiment.
Figure 5B:
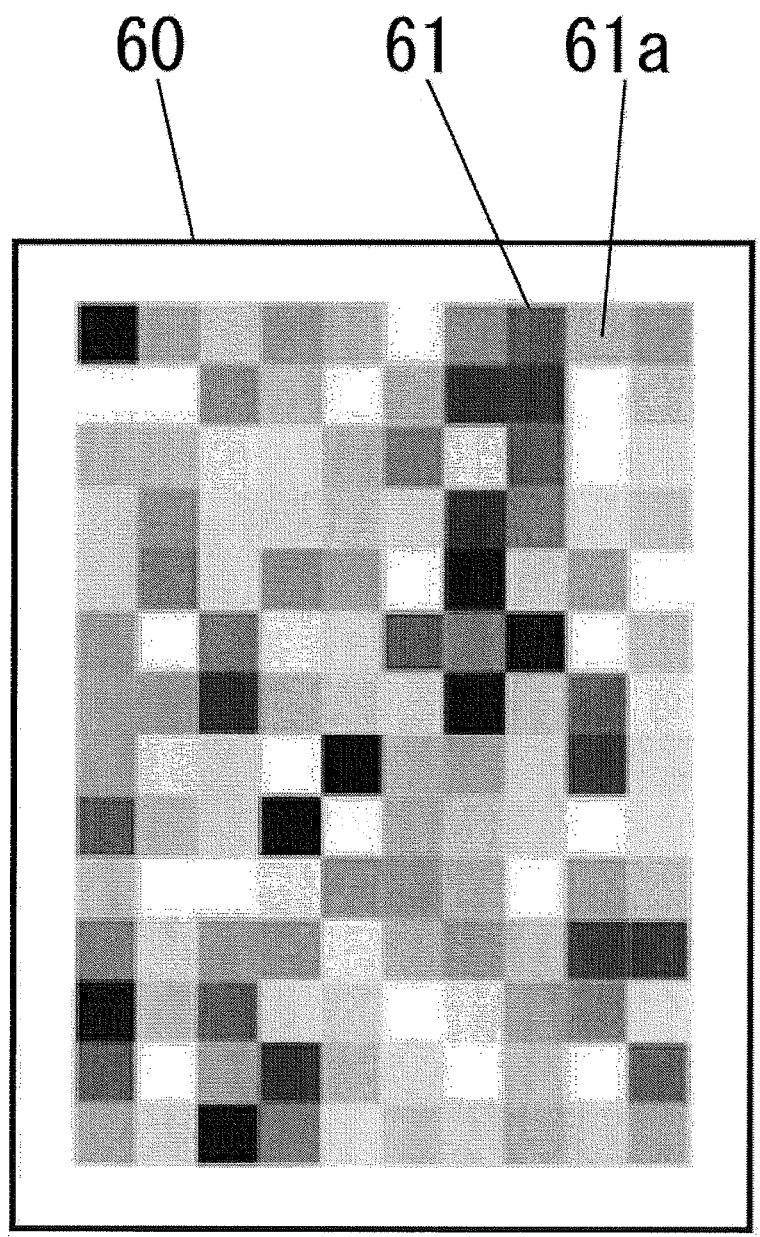
FIG. 5B illustrates a schematic diagram of one example of a target sheet printed based on other-apparatus updating image data according to the one embodiment.

FIG. 5A illustrates one example of a test sheet 50 printed based on the own-apparatus updating image data 37c. FIG. 5B illustrates one example of a target sheet 60 printed based on the other-apparatus updating image data 37d.

As illustrated in FIGS. 5A and 5B, the test sheet 50 is a sheet where: a test chart 51 as a first chart, which includes patches 51a in a plurality of colors; a frame border 52, which illustrates the position where the target sheet 60 or a reference sheet described later is arranged; a frame border 53, which surrounds the test chart 51; and a frame border 54, which surrounds the frame border 52 and the frame border 53, are printed by the printer 34.

The target sheet 60 is a sheet where a target chart 61 as a second chart, which includes patches 61a in a plurality of colors, is printed by the printer 34. The target chart 61 is similar to the horizontally reversed test chart 51, and is a chart corresponding to the test chart 51.

As illustrated in FIG. 3, the storage unit 37 stores reference chromaticity-value information 37e indicative of the respective chromaticity values of the patches in a reference chart where the chromaticity values independent from the device are already-known with respect to the patches.

Here, the following describes the chromaticity value independent from the device as an XYZ value.

The reference chart is a chart similar to the target chart 61 (see FIG. 5B). That is, the reference chart is similar to the horizontally reversed test chart 51 (see FIG. 5A), and is a chart corresponding to the test chart 51. However, the reference chart is not printed by the printer 34 and thus is excellent in accuracy of the color value compared with the test chart 51 or the target chart 61. The sheet on which the reference chart is drawn is referred to as a reference sheet.

For example, the control unit 38 includes: a CPU; a ROM, which stores a program and various data; and a RAM as a main storage device, which is used as the work area of the CPU. The CPU executes the program stored in the ROM.

The control unit 38 executes the calibration program 37a stored in the storage unit 37, so as to function as: a test-chart printing unit 38a, which causes the printer 34 to print the test chart 51 so as to generate the test sheet 50; a target-chart printing unit 38b, which causes the printer 34 to print the target chart 61 so as to generate the target sheet 60; a tone-characteristics correcting unit 38c, which corrects the tone characteristics of the MFP 30; and a target accepting unit 38d, which accepts an input instructing which of the reference chart and the target chart as a target of the correction for the tone characteristics of the MFP 30.

The following describes a method for calibration in the calibration system 10.

Figure 6:
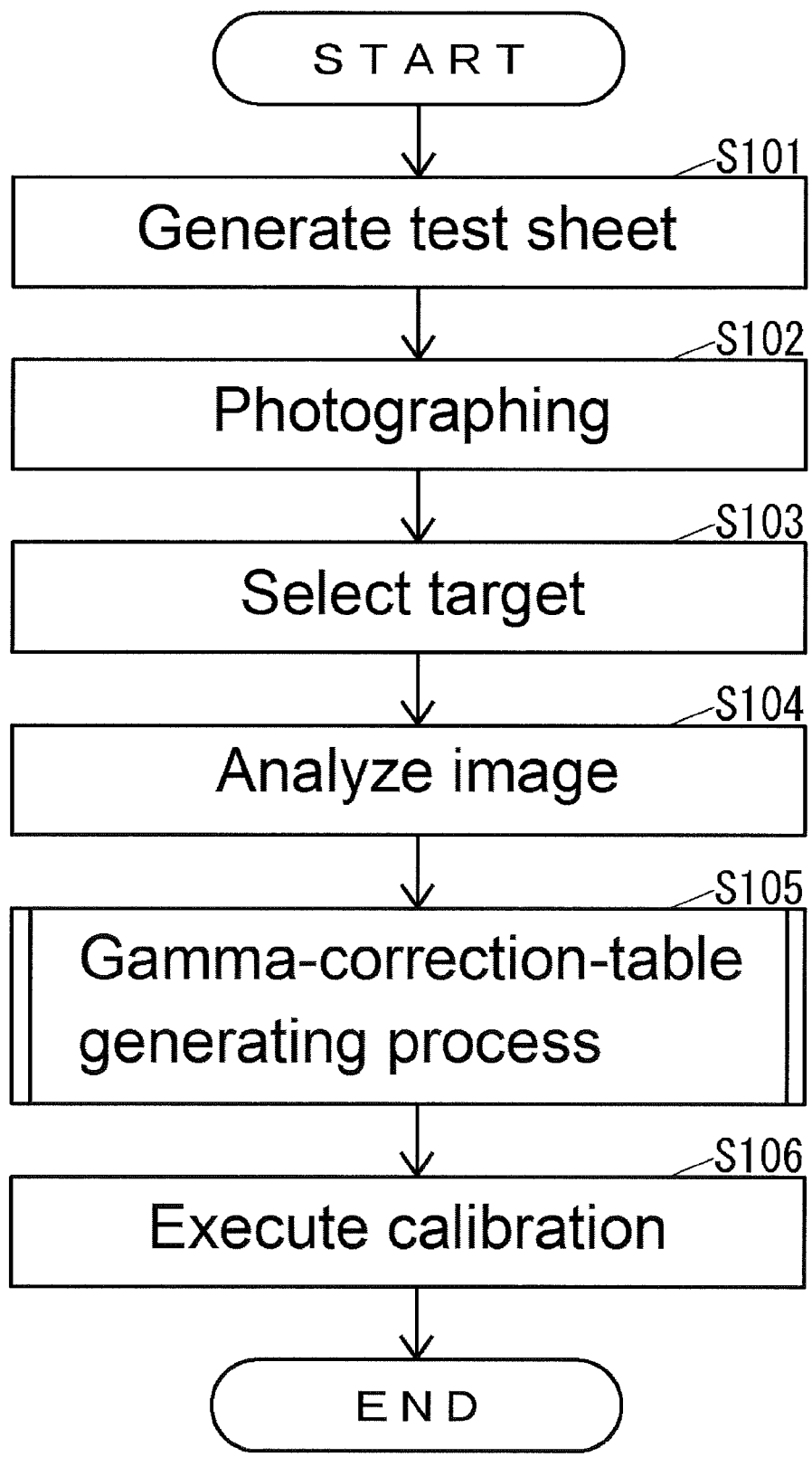
FIG. 6 illustrates a flowchart of a method for calibration in the calibration system according to the one embodiment.

FIG. 6 illustrates the method for calibration in the calibration system 10.

As illustrated in FIG. 6, the user instructs the MFP 30 to generate the test sheet 50 via the operation unit 31 of the MFP 30 or similar member. Accordingly, the test-chart printing unit 38a of the MFP 30 causes the printer 34 to print the test chart 51 so as to generate the test sheet 50 (in S101).

Here, when the user uses the target sheet generated by the MFP (hereinafter referred to as a "target MFP") as a target other than the MFP 30 in the process described later, the user instructs the target MFP to generate the target sheet. Accordingly, the target-chart printing unit of the target MFP causes the printer to print the target chart so as to generate the target sheet.

After the process in S101, the user photographs the test sheet 50 using the camera 23 of the smart phone 20 in the state where any one of the reference sheet and the target sheet generated by the target MFP is arranged within the frame border 52 of the test sheet 50 (in S102). Accordingly, when the reference sheet is arranged within the frame border 52 of the test sheet 50, the smart phone 20 simultaneously photographs the test chart 51 and the reference sheet so as to generate an image (hereinafter referred to as a "one-side print chart image") and transmit the generated one-side print chart image to the MFP 30. When the target sheet generated by the target MFP is arranged within the frame border 52 of the test sheet 50, the smart phone 20 simultaneously photographs the test chart 51 and the target chart so as to generate an image (hereinafter referred to as a "both-side print chart image") and transmit the generated both-side print chart image to the MFP 30.

After the process in S102, the user selects, for example, the target of the correction for the tone characteristics of the MFP 30 via the operation unit 31 of the MFP 30 (in S103). Specifically, when the smart phone 20 generates the one-side print chart image, the user selects the reference chart as the target of the correction for the tone characteristics of the MFP 30. When the smart phone 20 generates the both-side print chart image, the user selects the target chart as the target of the correction for the tone characteristics of the MFP 30. Accordingly, when the reference chart is selected, the target accepting unit 38d of the MFP 30 is a circuit that accepts the reference chart as the target of the correction for the tone characteristics of the MFP 30. When the target chart is selected, the target accepting unit 38d accepts the target chart as the target of the correction for the tone characteristics of the MFP 30.

Subsequently, the tone-characteristics correcting unit 38c of the MFP 30 is a circuit that analyzes the image transmitted from the smart phone 20, that is, the one-side print chart image or the both-side print chart image (in S104). Specifically, the tone-characteristics correcting unit 38c acquires the color values for the respective patches of the chart in the image.

Here, the following describes a color value in an image as an RGB value.

Subsequently, the tone-characteristics correcting unit 38c of the MFP 30 executes a gamma-correction-table generating process illustrated in FIG. 7 (in S105).

Figure 7:
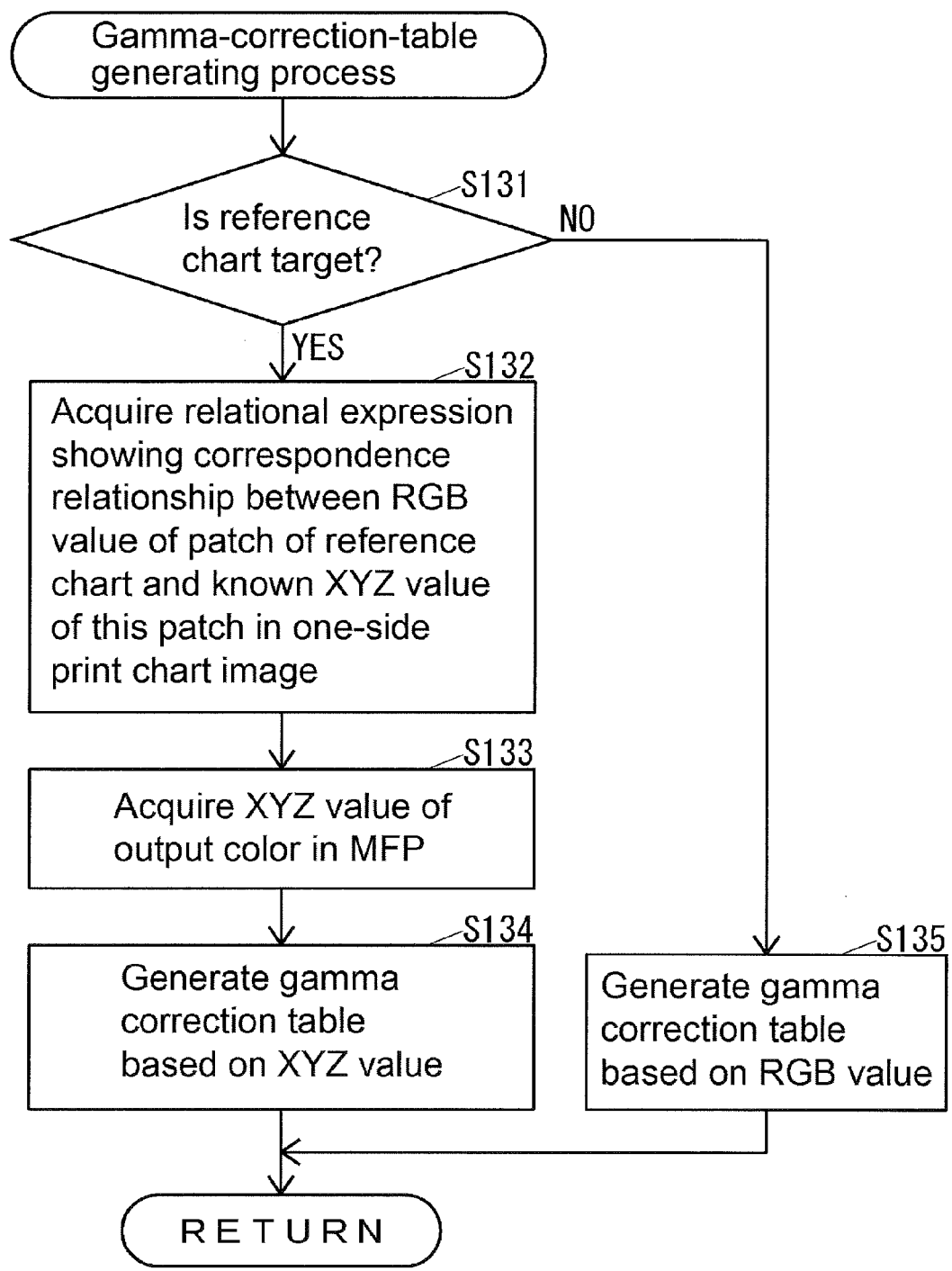
FIG. 7 illustrates a flowchart of a gamma-correction-table generating process according to the one embodiment.

FIG. 7 illustrates the gamma-correction-table generating process illustrated in FIG. 6.

As illustrated in FIG. 7, the tone-characteristics correcting unit 38c determines whether or not the reference chart is accepted as the target of the correction for the tone characteristics of the MFP 30 in S103 (in S131).

Figure 8:
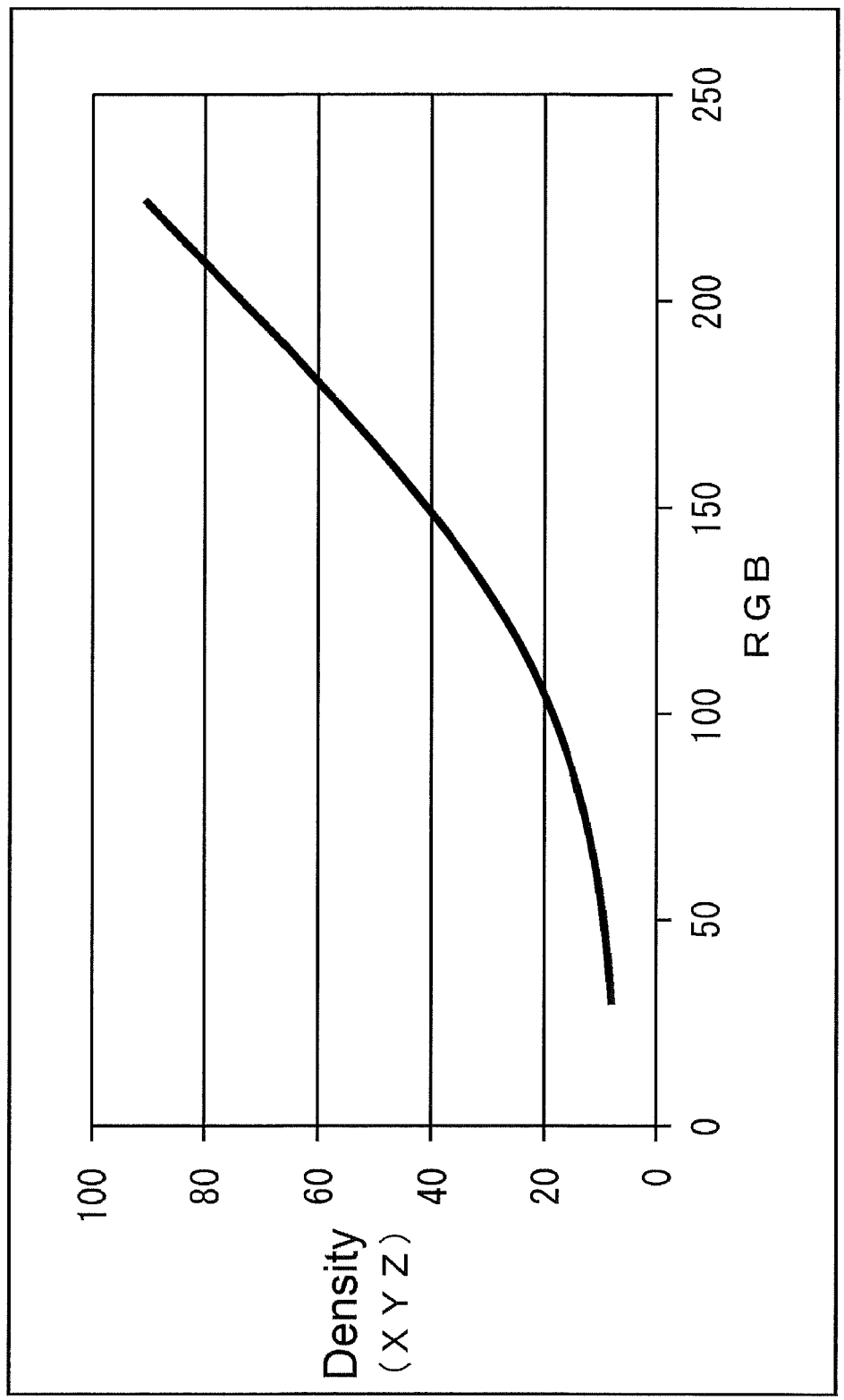
FIG. 8 illustrates a schematic diagram of one example of a relational expression generated in the gamma-correction-table generating process according to the one embodiment.

When the tone-characteristics correcting unit 38c determines that the reference chart is accepted as the target of the correction for the tone characteristics of the MFP 30 in S131, the tone-characteristics correcting unit 38c acquires the relational expression as illustrated in FIG. 8 (in S132). The relational expression shows the correspondence relationship between the RGB value of the patch of the reference chart and the known XYZ value of this patch in the one-side print chart image. Here, the tone-characteristics correcting unit 38c can acquire the known XYZ values of the respective patches in the reference chart based on the reference chromaticity-value information 37e. Accordingly, the tone-characteristics correcting unit 38c can detect the state where the RGB value in the one-side print chart image corresponds to what XYZ value based on the plurality of patches in the reference chart.

Figure 9:
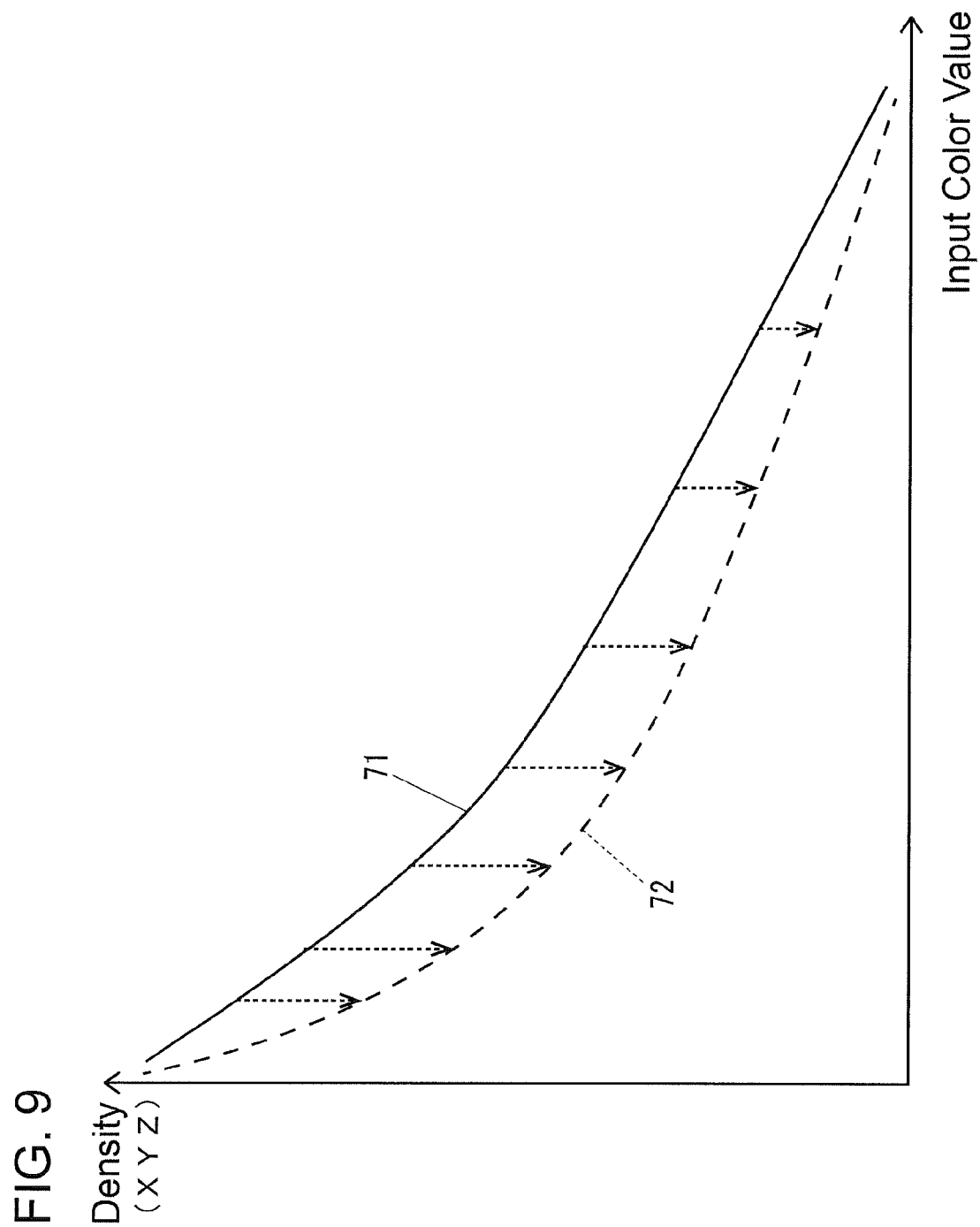
FIG. 9 illustrates a schematic diagram of one example of tone characteristics of the MFP according to the one embodiment.

After the process in S132, the tone-characteristics correcting unit 38c substitutes the RGB values of the respective patches 51a of the test chart 51 in the one-side print chart image for the relational expression acquired in S132, so as to acquire the XYZ values of the output colors by the MFP 30 for the patches 51a of the test chart 51 (in S133). Accordingly, as illustrated in FIG. 9, the tone-characteristics correcting unit 38c can acquire tone characteristics 71 of the MFP 30. Here, the tone characteristics 71 show the relationship between: the color value in the own-apparatus updating image data 37c with respect to the patch 51a of the test chart 51, that is, the input color value; and the XYZ value acquired in S133 with respect to this patch 51a. As illustrated in FIG. 9, the tone-characteristics correcting unit 38c can acquire a relationship 72 between: the color value in the own-apparatus updating image data 37c with respect to the patch 51a of the test chart 51, that is, the input color value; and the XYZ value set in the reference chromaticity-value information 37e with respect to the patch of the reference chart corresponding to this patch 51a.

After the process in S133, the tone-characteristics correcting unit 38c generates a gamma correction table for correcting the tone characteristics 71 of the MFP 30 to the relationship 72 in the reference chart as illustrated by the arrow in FIG. 9 (in S134). That is, the tone-characteristics correcting unit 38c generates a gamma correction table for correcting the tone characteristics 71 of the MFP 30 to the tone characteristics in accordance with the reference chart based on the difference between the XYZ value of the output color by the MFP 30 for the patch 51a of the test chart 51 and the known XYZ value of the patch of the reference chart.

Figure 10:
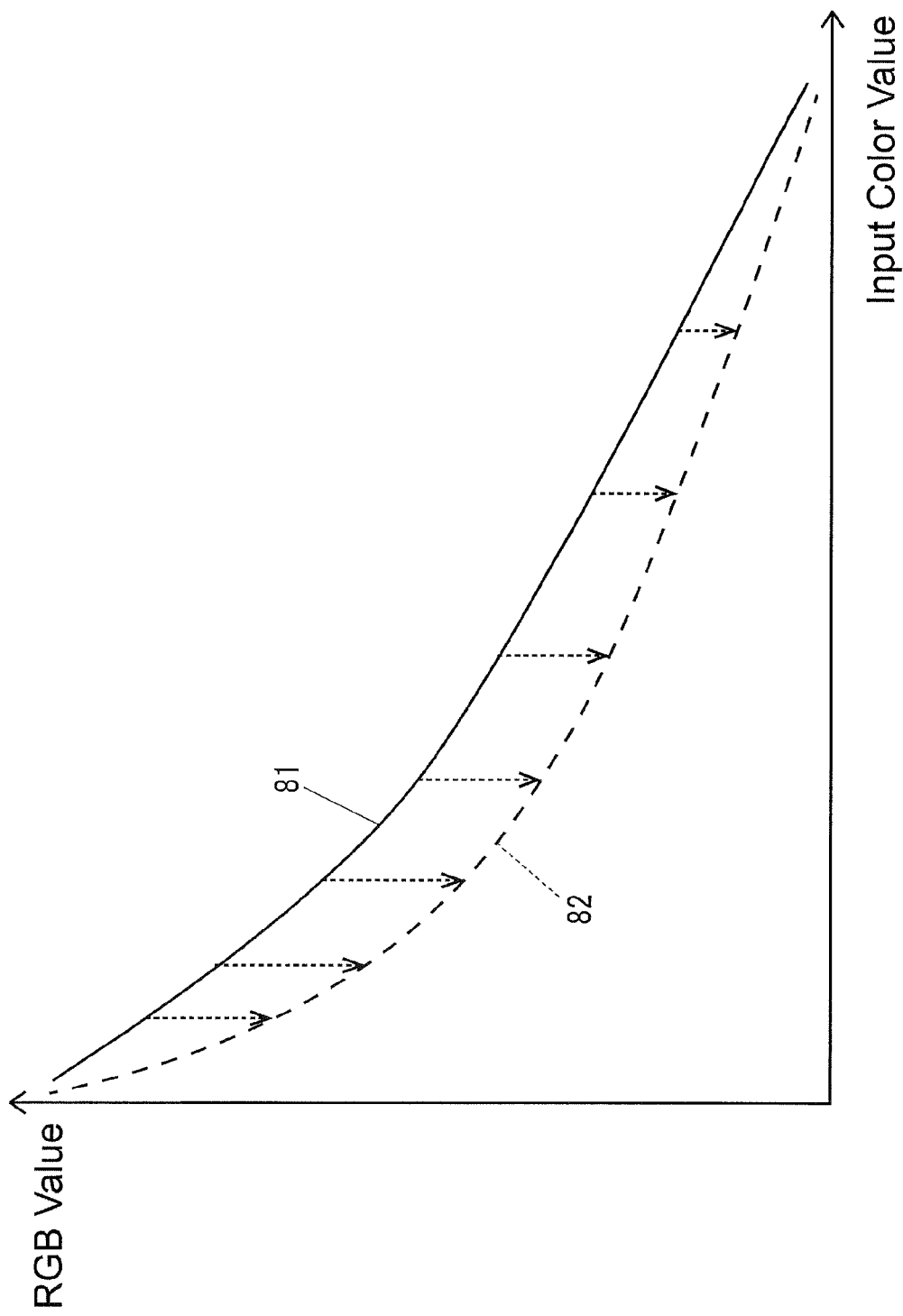
FIG. 10 illustrates a schematic diagram of one example of the relationship between an input color value in the MFP and an RGB value of a test chart in a both-side print chart image according to the one embodiment.

When the tone-characteristics correcting unit 38c determines that the reference chart is not accepted as the target of the correction for the tone characteristics of the MFP 30, that is, the target chart as the target of the correction for the tone characteristics of the MFP 30 is accepted in S131, the tone-characteristics correcting unit 38c generates a gamma correction table for correcting the tone characteristics of the MFP 30 to the tone characteristics of the target MFP (in S135). Specifically, as illustrated in FIG. 10, the tone-characteristics correcting unit 38c can acquire a relationship 81 between: the color value in the own-apparatus updating image data 37c with respect to the patch 51a of the test chart 51, that is, the input color value; and the RGB value in the both-side print chart image with respect to this patch 51a. The tone-characteristics correcting unit 38c can acquire a relationship 82 between: the color value in the own-apparatus updating image data 37c with respect to the patch 51a of the test chart 51, that is, the input color value; and the RGB value in the both-side print chart image with respect to the patch of the target chart corresponding to this patch 51a. Accordingly, the tone-characteristics correcting unit 38c generates a gamma correction table for correcting the relationship 81 in the test chart 51 to the relationship 82 in the target chart as illustrated by the arrow in FIG. 10. That is, the tone-characteristics correcting unit 38c generates a gamma correction table for correcting the tone characteristics of the MFP 30 to the tone characteristics of the target MFP based on the difference between the test chart 51 in the both-side print chart image and the RGB value of the patch of the target chart.

After the process in S134 or the process in S135 terminates, the tone-characteristics correcting unit 38c terminates the gamma-correction-table generating process illustrated in FIG. 7.

As illustrated in FIG. 6, the tone-characteristics correcting unit 38c updates the gamma correction table 37b on the storage unit 37 to the gamma correction table generated by the gamma-correction-table generating process in S105, so as to execute calibration (in S106).

As described above, the calibration system 10 corrects the tone characteristics of the MFP 30 to the tone characteristics of the target MFP based on the difference in RGB value of the patches between the test chart 51 and the target chart in the both-side print chart image generated such that the test chart 51, which is printed by the MFP 30 in S101, and the target chart, which is printed by the target MFP, are simultaneously photographed by the smart phone 20 in S102 (in S135 and S106). Thus, the XYZ value of the output color of the MFP 30 can be directly coordinated with the XYZ value of the output color of the target MFP.

The calibration system 10 can causes the user to select which of the color value of the reference chart and the color value of the output color of the target MFP, for coordinating with the color value of the output color of the MFP 30 (in S103), thus ensuring an improved convenience.

Here, while in the above description the calibration system 10 causes the MFP 30 to execute the processes in S103 to S105, at least a part of the processes in S103 to S105 may be executed by the smart phone 20. For example, when the process in S103 is executed by the smart phone 20, the target of the correction for the tone characteristics of the MFP 30 may be selected via the operation unit 21 of the smart phone 20. When all the processes in S103 to S105 are executed by the smart phone 20, gamma correction data generated in S105 is transmitted to the MFP 30 from the smart phone 20.

The image forming apparatus of the disclosure is the MFP in this embodiment, but may be an image forming apparatus other than the MFP. For example, the image forming apparatus of the disclosure may be an image forming apparatus such as a printer-only machine, a copy-only machine, and a FAX-only machine.

The photographing device of the disclosure is a smart phone in this embodiment, but may be another photographing device other than the smart phone. For example, the other photographing device of the disclosure may be a digital camera.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A calibration system, comprising:
a photographing device; and
a plurality of image forming apparatuses including:
a first image forming apparatus that prints a first chart including patches in a plurality of colors;
a second image forming apparatus that prints a second chart corresponding to the first chart;
a target accepting circuit that accepts which of a reference chart and the second chart as a target of correction for a tone characteristic of the first image forming apparatus, wherein the reference chart includes chromaticity values as XYZ values independent from any of the plurality of image forming apparatuses for the patches in the first chart; and
a tone-characteristics correcting circuit that corrects the tone characteristics of the first image forming apparatus,
(i) wherein, when the target accepting circuit accepts the reference chart as the target of correction, using a one-side print chart image being generated such that the first chart and the reference chart are simultaneously photographed by the photographing device, the tone-characteristics correcting circuit:
acquires a relational expression that shows a relationship between first RGB values for the patches in the reference chart, and first XYZ values for the patches in the reference chart stored in each of the plurality of image forming apparatuses;
acquires second XYZ values of output colors by the first image forming apparatus for the patches in the first chart, by substituting second RGB values of the output colors by the first image forming apparatus for the patches in the first chart, into the relational expression;
acquires a relationship between input color values being RGB values of data of the first chart, and the second XYZ values;
acquires a relationship between the input color values and the first XYZ values; and
generates a gamma correction table for correcting the tone characteristic of the first image forming apparatus to the tone characteristic in accordance with the reference chart, based on a difference between the first XYZ values and the second XYZ values, and
(ii) wherein, when the target accepting circuit accepts the second chart as the target of correction, using a both-side print chart image being generated such that the first chart and the second chart are simultaneously photographed by the photographing device, the tone-characteristics correcting circuit;
acquires a relationship between the input color values and the second RGB values;
acquires a relationship between the input color values and third RGB values for the patches in the second chart; and
generates a gamma correction table for correcting the tone characteristics of the first image forming apparatus to the tone characteristics of the second image forming apparatus, based on a difference between the second RGB values and the third RGB values.

2. A calibration method comprising:
printing a first chart including patches in a plurality of colors by a first image forming apparatus;
printing a second chart corresponding to the first chart by a second image forming apparatus;
accepting which of a reference chart and the second chart as a target of correction for a tone characteristic of the first image forming apparatus, wherein the reference chart includes chromaticity values as XYZ values independent from any of the plurality of image forming apparatuses for the patches in the first chart;

(i) when accepting the reference chart as the target of correction, using a one-side print chart image being generated such that the first chart and the reference chart are simultaneously photographed by the photographing device, acquiring a relational expression that shows a relationship between first RGB values for the patches in the reference chart, and first XYZ values for the patches in the reference chart stored in each of the plurality of image forming apparatuses;

acquires second XYZ values of output colors by the first image forming apparatus for the patches in the first chart, by substituting second RGB values of the output colors by the first image forming apparatus for the patches in the first chart, into the relational expression;

acquiring a relationship between input color values being RGB values of data of the first chart, and the second XYZ values;

acquiring a relationship between the input color values and the first XYZ values; and generating a gamma correction table for correcting the tone characteristic of the first image forming apparatus to the tone characteristic in accordance with the reference chart, based on a difference between the first XYZ values and the second XYZ values, and (ii) when accepting the second chart as the target of correction, using a both-side print chart image being generated such that the first chart and the second chart are simultaneously photographed by the photographing device, acquiring a relationship between the input color values and the second RGB values;

acquiring a relationship between the input color values and third RGB values for the patches in the second chart; and generating a gamma correction table for correcting the tone characteristics of the first image forming apparatus to the tone characteristics of the second image forming apparatus, based on a difference in color value of patches between the second RGB values and the third RGB values.

\* \* \* \* \*